Feb. 16, 1926.

E. L. GEHMAN 1,573,602

ELECTRIC BAKE OVEN

Filed Oct. 2, 1923

Inventor
Elmer Lloyd Gehman
H. & H. L. Reynolds.
By
Attorneys

Patented Feb. 16, 1926.

1,573,602

UNITED STATES PATENT OFFICE.

ELMER LLOYD GEHMAN, OF SEATTLE, WASHINGTON.

ELECTRIC BAKE OVEN.

Application filed October 2, 1923. Serial No. 666,075.

*To all whom it may concern:*

Be it known that I, ELMER LLOYD GEHMAN, a citizen of the United States of America, and resident of the city of Seattle, in the county of King and State of Washington, have invented certain new and useful Improvements in Electric Bake Ovens, of which the following is a specification.

My invention relates to baking devices and consists of an oven and a holding rack therefor of complemental design, so as to be handled together to secure a desirable result.

The object of my invention is to provide an electric bake oven and a rack for holding the bread, so designed that the work of operating the oven may be materially reduced.

The features of my device which I believe to be new and upon which I wish to secure Letters Patent will be herein described and then particularly pointed out in the claim.

The accompanying drawings show, in diagrammatic form, the construction of devices involving my invention.

Figure 1:
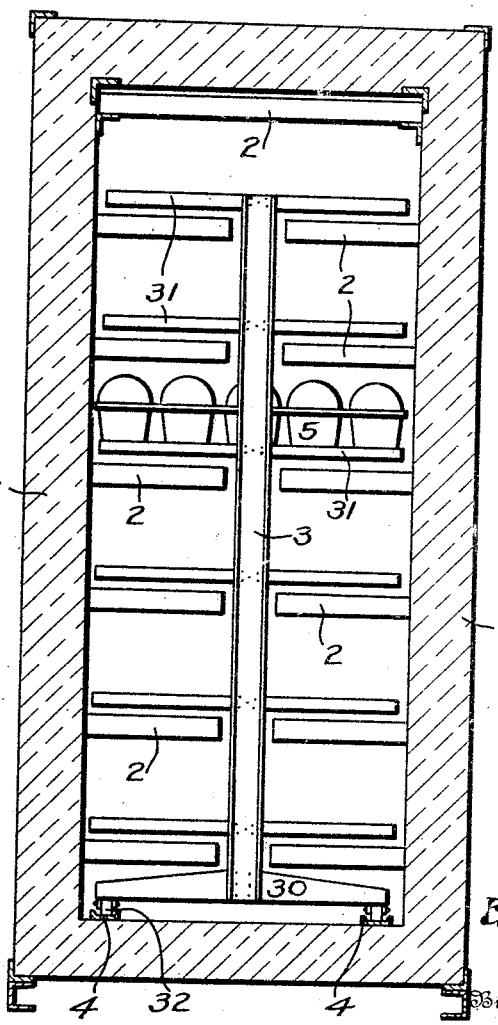
Figure 1 is a transverse sectional view of the oven, showing a bread holding rack in place.

A customary construction of electric bake ovens is one in which the electric heating elements are installed in the ovens in the manner resembling the placing of a number of shelves, the same extending entirely across the oven, and at least frequently these are combined or associated with the shelves which support the pans in which the bread is baked. In this type of construction it is necessary that the pans containing the bread be inserted and moved about in the oven and then removed therefrom by hand, one at a time. By my present invention I contemplate the employment of bread racks which are movable, upon which the bread may be placed while it is without the oven, and which may be bodily inserted as a whole within the oven so that the placing of bread within and the removing of the same from the oven is an operation employing only a very few minutes.

In the drawings 1 represents the walls of the oven. These are provided with electric heating elements in the physical form of slabs or shelves, as 2, which are supported from the walls and project into the oven space. In the type of construction shown in Figure 1 these electric heating elements extend towards but not quite to the center line of the oven. These are separated from each other so as to provide a central free space capable of receiving the standards or supporting elements of the bread rack.

For use with an oven having this central free space, the bread rack would be composed of one or more standards 3, having feet or base members 30 extending laterally thereof a sufficient distance to form a staple support therefor, and with these the supporting shelves or racks 31 upon which the bread is placed. In Figure 1 I have shown one of these shelves 31 as having thereon a set of bread pans 5. The shelves 31 of the bread rack are placed at an elevation such that when the rack is inserted into the oven, they will be just above the electric heating elements 2. This brings the bread so that it is a short distance below the heating element 2 next above the same.

The floor of the oven is provided with guide rails as 4, for the reception of rollers 32 which are placed under the bread rack. This insures accurate placing of the tray when it is inserted in the oven.

Figure 2:
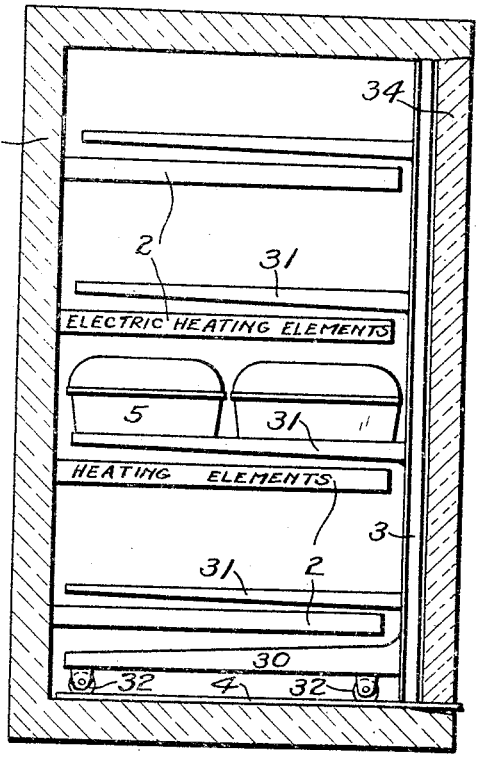
Figure 2 is a section taken at right angles to that of Figure 1, showing a type of oven and rack involving the same principles but slightly varying in details of construction.

In the type of oven shown in Figure 2 the heating elements 2 are extended entirely across the oven chamber but are spaced back from the door 34 a sufficient distance to accommodate the supporting post 3 of the bread rack. In this case also, the supporting shelves 31 of the bread rack are carried from the posts or standards 3 by one end only, and are positioned so as to lie just above the electric heating elements 2. For this type of bread rack the feet 30 extend forwardly from the standards, as is clearly shown in Figure 2. In either form of construction the vertical spacing of the bread supporting shelves 31 of the rack and the heating elements 2, is such that the shelves 31 will pass close above the heating elements 2, and the length of the heating element is such as to accommodate the vertical posts or supporting standards of the rack.

By employing an oven and racks of this character it is possible to load the racks while they are out of the oven, under conditions in which it is comfortable to work. In charging the oven the door is opened and a previously loaded rack is rolled into place. In emptying the oven the rack with its load of bread is removed as a whole, which also takes but a moment. In consequence, the work of tending the oven has been freed of the hot and arduous work which is attendant upon the work of caring for an oven of the usual type referred to.

What I claim as my invention is:

The combination with an electric bake oven having electric heating elements projecting from the side walls and having an unsupported edge spaced from the wall a distance to accommodate rack standards, and carrying racks having a supporting base, standards at one side of the base tray carrying racks extending horizontally from the standards, said racks being vertically spaced to clear the heating elements and the standards to be in the space at the unsupported edges of the heating element.

Signed at Seattle, King County, Washington this 27th day of September 1923.

ELMER LLOYD GEHMAN.